United States Patent Office.

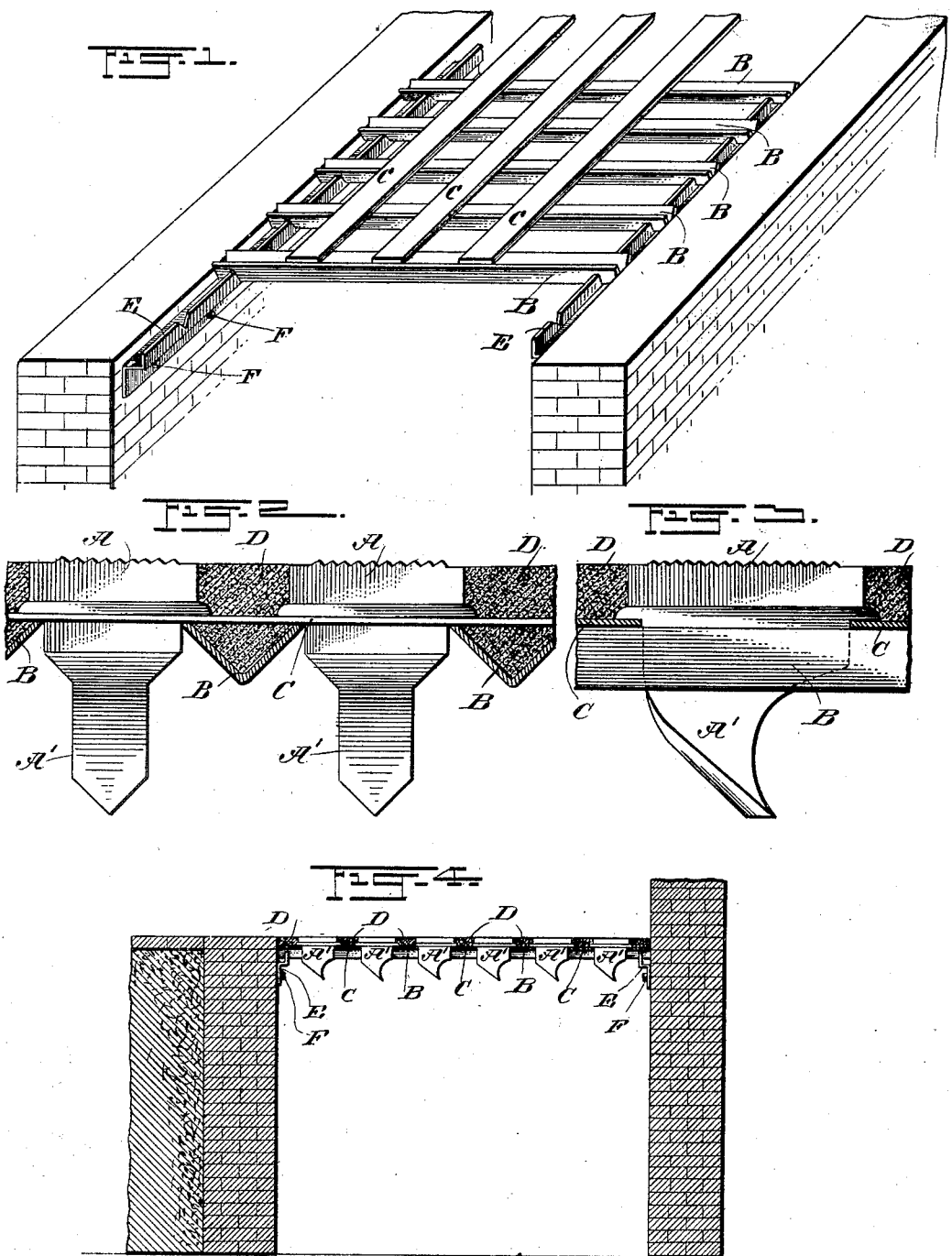

LOUIS BRAUN, OF NEW YORK, N. Y., ASSIGNOR OF ONE-HALF TO JOSEPH BUELLESBACH, OF NEW YORK, N. Y.

VAULT-LIGHT.

SPECIFICATION forming part of Letters Patent No. 699,783, dated May 13, 1902.

Application filed November 1, 1901. Serial No. 80,766. (No model.)

*To all whom it may concern:*

Be it known that I, LOUIS BRAUN, of the borough of Manhattan, city and State of New York, have invented a new and useful invention for Improvements in Vault-Lights, of which I hereby declare the following to be a full, clear, and exact description, reference being had to the accompanying drawings, in which—

Figure 1 represents a perspective view. Fig. 2 represents a longitudinal sectional view. Figs. 3 and 4 represent transverse sectional views.

Like letters in all the figures refer to the same parts.

My improvement is to so construct a vault-light that if any part should be injured it can be taken out irrespective of the other parts thereof and be replaced cheaply, and that the glass bull's-eyes to be inserted in said frame will form reflectors, so as to reflect and diffuse the light in any direction desired.

The construction and operation of my invention or improvement are as follows: I take any suitable length of wrought Z-iron, which I attach by one of its flanges E, by means of bolts F or otherwise, to the sills of the vault to be lighted, and on the upper flange thereof I cut or otherwise form V-grooves at any suitable distance from each other. I then place across the vault to be covered wrought-iron angle-bars B, so that the outer ends of the angle-iron bars B rest in the V-shaped grooves cut in the Z-iron flanges E, which V-grooves keep said bars steady and in place. I then form glass bull's-eyes A by molding or otherwise, having one side a reflecting-surface, preferably the under side A', so that the light entering from top of each bull's-eye A will be reflected inwardly in any direction desired, each bull's-eye having a groove or flange cast or cut or formed thereon near its upper surface to keep it in place. When the angle-iron bars B are placed in their proper position resting in the V-grooves cut in the flanges of the Z-iron, I place over the same wrought-iron transverse flat-iron bars C, and I insert in the spaces between the angle-iron bars B and the flat-iron bars C a row of glass bull's-eyes, closing up the flat-iron bars C, so that they will fit under the flanges or into the grooves or flanges cut or formed on the bull's-eyes A. This I repeat as to the bull's-eyes and flat transverse bars until the entire surface of the vault is covered, when I cement together by means of any suitable cement D, thereby making a vault-light of great strength and durability, and, if injured, any part thereof can be detached and repaired without injury to the other parts and at a small expense.

Now, having fully described my invention, what I claim, and wish to secure by Letters Patent, is—

1. The combination of wrought Z-iron sill-bars having grooves cut or otherwise formed therein, wrought angle-iron bars B, the iron bars B to fit into the grooves of the Z-iron sill-bars, wrought flat-iron transverse bars C, and glass bull's-eyes, substantially as described, and for the purpose specified.

2. The combination of wrought Z-iron sill-bars having grooves cut or otherwise formed therein, wrought flat-iron transverse bars C, wrought angle-iron bars B, the iron bars B to fit into the grooves of the Z-iron sill-bars, and reflecting bull's-eyes substantially as described and for the purpose specified.

In testimony whereof I have signed my name to this specification in the presence of two subscribing witnesses.

LOUIS BRAUN.

Witnesses:
 JACOB H. BERNSTEIN,
 SAMUEL GOLDBERG.